June 2, 1970  V. K. ZADOO  3,515,165

PRESSURE REGULATOR

Filed Oct. 16, 1968

INVENTOR
VIJAY K. ZADOO
BY
ATTORNEY

United States Patent Office 3,515,165
Patented June 2, 1970

3,515,165
PRESSURE REGULATOR
Vijay K. Zadoo, Mount Prospect, Ill., assignor to Vapor Corporation, Chicago, Ill., a corporation of Delaware
Filed Oct. 16, 1968, Ser. No. 767,949
Int. Cl. F16k
U.S. Cl. 137—220
10 Claims

ABSTRACT OF THE DISCLOSURE

Pressure regulator for controlling the flow of fluid at a set pressure including a housing having an inlet and an outlet and valve means supported therein responsive to the pressure at the outlet for controlling the fluid flow through the inlet, wherein the valve means coacts with a pressure responsive means positioned at the outlet.

---

Figure 1:
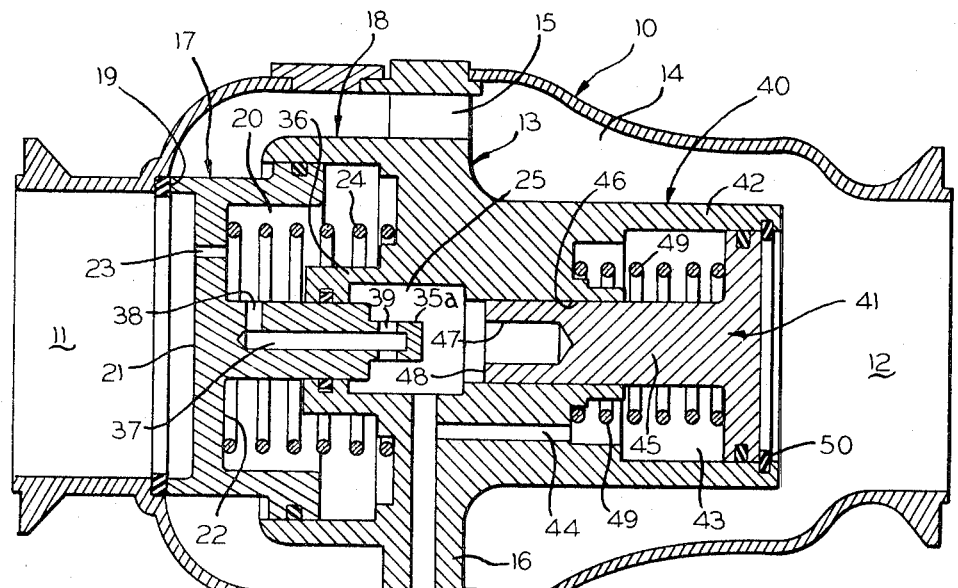

This invention relates in general to a pressure regulator for controlling the flow of fluid in a line, and more particularly to a pneumatic pressure regulator capable of regulating the fluid flow at the inlet in response to a set pressure at the outlet, and still more particularly to a pressure regulator of minimum envelope and weight with a high degree of reliability, where a minimum number of moving parts is employed.

Pressure regulators heretofore developed have included a high number of moving parts, and have not provided satisfactory, reliable performance.

The pressure regulator of this invention includes a housing or shell having an inlet at one end and an outlet at the other end axially aligned with the inlet. A valve support means is mounted within the housing between the inlet and outlet and centrally within the housing to define therewith an annular in cross section shaped fluid passageway between the inlet and outlet. An actuator piston is slidably received in a cylinder formed in the support means adjacent the inlet for coacting with the inlet to regulate the flow volume through the regulator. The actuator piston defines with the cylinder an actuator pressure chamber. A bleed hole is provided in the actuator piston for intercommunicating the pressure at the inlet with the actuator pressure chamber, and a valve is arranged for selectably intercommunicating the actuator pressure chamber with the atmosphere. Opening of the valve reduces the pressure in the actuator pressure chamber, thereby causing the pressure at the inlet to force the actuator piston away from the inlet and open the regulator. Closing of the valve allows the pressure to build up within the actuator pressure chamber by virtue of the bleed hole to equal the pressure at the inlet, and since the area of the actuator piston within the actuator pressure chamber is greater than that facing the inlet, the build-up of pressure will cause the actuator piston to move toward the inlet to a closed position. A pilot piston is also slidably mounted in a cylinder formed in the support means adjacent the outlet of the regulator and accordingly, responsive to the pressure at the outlet. Coacting parts on the actuator piston and the pilot piston further regulates the intercommunication between the actuator pressure chamber and the atmosphere to regulate the position of the actuator piston. Thus, the pilot piston, in responding to the pressure at the outlet, controls the throttling action of the actuator piston to provide a relatively constant pressure at the outlet.

Accordingly, it is an object of the present invention to provide a new and improved pressure regulator having a minimum envelope and weight with a high degree of reliability, when the use of a minimum number of moving parts is employed.

Another object of this invention is in the provision of a pressure regulator for providing a set pressure at the outlet by controlling the flow of fluid at the inlet in response to the outlet pressure, wherein a high reliability is achieved, because of a minimum number of moving parts.

Still another object of this invention resides in the provision of a pressure regulator capable of self-regulation of pressure, wherein inherent better stability and performance is achieved by use of a servomechanism type piloting means.

A further object of the present invention is to provide a pressure regulator capable of damping out any tendency of the actuator piston to oscillate.

Figure 2:
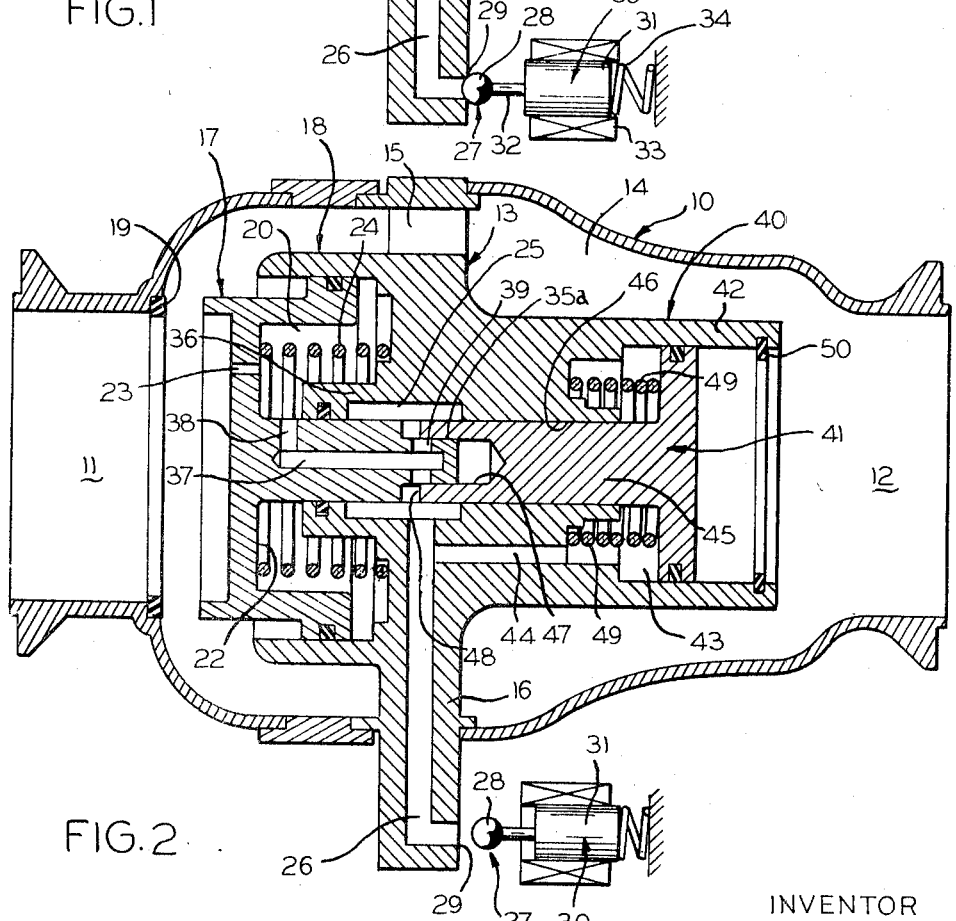

Other objects, features and advantages of the invention will be apparent from the following detailed disclosure, taken in conjunction with the accompanying sheets of drawings, wherein like reference numerals refer to like parts, in which:

FIG. 1 is an axial, sectional view taken through the pressure regulator of the present invention and illustrating the parts when the regulator is closed; and FIG. 2 is a view similar to FIG. 1, but illustrating the parts in position with the valve in regulating position.

Referring now to the drawings, the pressure regulator of the present invention includes generally a housing or shell 10 having axially aligned inlet and outlet openings 11 and 12. While the inlet and outlet have approximately the same size openings, it should be appreciated that one may be larger than the other, if so desired. Further, the outside configuration of the housing 10 may take any desired form, but would preferably be circular in cross section with an enlarged area arranged adjacent the inlet and necking down to the outlet opening adjacent thereto.

A valve support means 13 is supported within the housing 10 and along the central axis between the inlet and outlet to define an annular in cross section passageway 14 with the housing 10. Thus, the fluid flow through the regulator when it is open extends from the inlet 11 through the fluid passageway 14 and out the outlet 12. The valve support means 13 is suitably supported within the housing, such as by a plurality of radially-arranged bars or webs 15 and 16, which do not obstruct to any appreciable degree the fluid passageway 14.

An actuator piston 17 is supported at the inlet in slidable relation with a cylinder 18 formed on the valve support means 13. The actuator piston 17 is formed to coact with a valve seat 19 in regulating the flow of fluid from the inlet 11 into the fluid passageway 14 between zero flow and a desired flow that will provide a set pressure at the outlet opening 12. An actuator pressure chamber 20 is defined by the actuator piston and the cylinder. The inlet pressure face 21 of the actuator piston is of less area than the actuator pressure chamber face 22, whereby intercommunication between the inlet and the actuator pressure chamber by a bleed hole or orifice 23, formed in the piston, causes the piston to move toward the closed position abutting the valve seat 19. An actuator spring 24 bottoming at one end on the actuator pressure chamber face 22 of the actuator piston and at the other end on the closed end of the cylinder 18 further enhances the movement of the actuator piston toward the inlet, when the pressure within the actuator pressure chamber equals that at the inlet.

Opening of the actuator piston 17 is achieved by venting the actuator pressure chamber 20 to atmosphere. An atmosphere chamber 25 is defined centrally of the valve support means 13 and communicates through the passageway 26 with a ball valve 27. Ball valve 27 includes a ball 28 and a seat 29 at the outer end of the passageway 26. Movement of the ball valve is controlled by a solenoid 30 having an armature 31 slidable within a coil 33 and spring biased to urge the ball 28 in closed position against the seat 29 by a spring 34. Energization of the solenoid causes the plunger 31 to move against the spring 34 and pull the ball 28 away from the valve seat 29 to open the valve 27 and intercommunicate the atmosphere chamber 25 with the atmosphere surrounding the pressure regulator.

Intercommunication of the atmosphere chamber 25 with the actuator pressure chamber 20 is achieved by the provision of a hollow shaft or piston 35 extending from the actuator pressure chamber face 22 and in sealing and slidable arrangement with a cylinder 36 formed at one end of the pressure chamber 25. An axially-extending passageway 37 is provided in the hollow shaft 35 and ported with the actuator pressure chamber 20 at 38 and with the atmosphere chamber 25 at 39. The porting 39 is provided on a diametrically-reduced portion of the shaft 35. Accordingly, intercommunication between the actuator pressure chamber 20 and the atmosphere chamber 25 provides intercommunication between the ball valve 27 and the actuator pressure chamber 20. Opening of the ball valve 27, by energization of the solenoid 30 thereby reduces the pressure within the actuator pressure chamber 20 below the pressure at the inlet 11, whereby the inlet pressure against the inlet pressure face 21 of the actuator piston 17 causes the actuator piston to move toward open position away from the valve seat 19.

In order to regulate the pressure at the outlet 12 to a set pressure, a servomechanism-type piloting means 40 is provided in the valve support means 13 at the outlet 12 to respond to the outlet pressure and regulate the venting of the actuator piston chamber 20 when the ball valve 27 is open. This piloting means includes a pilot piston 41 slidably received within a cylinder 42 and defining with the cylinder a pilot pressure chamber 43 that is in constant communication with the atmosphere when the ball valve 27 is open by means of a passageway 44. The pilot piston 41 includes a stem 45 axially extending toward the inlet end of the regulator and being sealingly and slidably received in a cylinder 46. The free end of the stem 45 includes a blind bore 47 that mates with the diametrically reduced shaft portion 35a of the hollow shaft 35. Thus, as the pilot piston 41 and the actuator piston 17 move toward each other, the shaft portion 35a moves within the bore 47, whereby the leading edge 48 of the pilot piston stem coacts with the porting 39 to restrict same, thereby regulating the venting of the actuator pressure chamber 20 to the atmosphere when the ball valve 27 is open. A return spring 49 moves the pilot piston 41 to its home position against a retainer ring 50 when the ball valve 27 is closed and the pressure within the actuator pressure 20, the atmosphere chamber 25, and the pilot piston pressure chamber 43 equals the pressure at the inlet 11.

As seen in FIG. 1, the ball valve 27 is closed, which causes the actuator piston 17 to be in closed position and the pilot piston 41 to be in home position against the retainer 50. Upon opening of the ball valve 27 by energization of the solenoid 30, the reduction of pressure within the actuator pressure chamber 20 causes the pressure acting on the actuator piston at the inlet 11 to drive the actuator piston on an open position, such as shown in FIG. 2. This open position is regulated by the pressure sensed at the outlet 12. The pressure at the outlet 12 increases as the air flows through the regulator, and when the pressure at the outlet rises above its set point, it overcomes the force of the pilot spring 49 and moves the pilot piston 41 toward the actuator piston 17. As the leading edge 48 of the pilot piston stem 45 restricts the air flowing from the actuator pressure chamber 20 to the atmosphere chamber 25, the pressure in the actuator pressure chamber increases and moves the actuator piston 17 toward the closed position, thereby reducing air flow through the regulator to bring the pressure at the outlet 12 down to its set point.

The area of the bleed-out hole or porting 39 in the actuator piston shaft 35 is many times larger than the area of the bleed orifice 23. Accordingly, a small change in the position of the actuator piston 17 relative the pilot piston 41 causes a large change in the pressure of the actuator pressure chamber 20. Thus, if the actuator piston 17 should tend to oscillate, the large changes in pressure within the actuator pressure chamber 20 counteract and damp the oscillations.

It will be understood that modifications and variations may be effected without departing from the scope of the novel concepts of the present invention.

The invention is hereby claimed as follows:

1. A pressure regulator comprising, a housing having an inlet and an outlet axially aligned therewith, a support means within the housing between the inlet and outlet and centrally arranged to define with the housing a generally annular passageway extending between the inlet and outlet, a cylinder at the end of the support means adjacent the inlet and a valve actuator piston slidably received therein and movable toward and away from the inlet to coact therewith and regulate flow through the passageway, said actuator piston defining with said cylinder an actuator pressure chamber, a bleed hole in said actuator piston communicating the pressure at the inlet with the actuator pressure chamber, means selectively intercommunicating the actuator pressure chamber with the atmosphere for causing the movement of the valve actuator piston toward and away from the inlet, and means responsive to the pressure at the outlet to regulate the position of the actuator piston to maintain a set pressure at the outlet.

2. A pressure regulator as defined in claim 1, wherein said pressure setting means at the outlet includes a piston communicating with the outlet pressure and having means coacting with orifice means on said actuator piston for controlling the communication between atmosphere and the pressure actuator chamber.

3. A pressure regulator as defined in claim 1, wherein said selective intercommunicating means includes a valve and means for operating same between open and closed positions.

4. A pressure regulator as defined in claim 3, wherein said valve means includes a solenoid.

5. A pressure regulator as defined in claim 1, wherein spring means normally biases said actuator piston toward the outlet.

6. A pressure regulator as defined in claim 1, wherein said outlet pressure responsive means includes a pilot piston in a cylinder formed in the support means at the end adjacent the outlet, a stem on said pilot piston, a shaft on said actuator piston having a passageway therethrough terminating in a bleed port isolated from said actuator pressure chamber and communicating with the atmosphere selective intercommunication means, and means on said pilot piston stem coacting with said bleed port to restrict same in response to movement of said pilot piston.

7. A pressure regulator as defined in claim 6, wherein said bleed port is substantially larger than said bleed hole.

8. A pressure regulator as defined in claim 6, spring means biasing said actuator piston toward said inlet, and spring means biasing said pilot piston toward said outlet to open said bleed port.

9. A pressure regulator comprising, a housing having an inlet and an outlet axially aligned therewith, a support means within the housing between the inlet and outlet and centrally arranged to define with the housing a generally annular passageway extending between the inlet and outlet, a cylinder at the end of the support means adjacent the inlet and a valve actuator piston slidably received therein and movable toward and away from the inlet to coact therewith and regulate flow through the passageway, said actuator piston defining with said cylinder an actuator pressure chamber, a bleed hole in said actuator piston communicating the pressure at the inlet with the actuator pressure chamber, an atmosphere chamber defined within said support means, passageway means between the atmosphere chamber and the atmosphere, valve means associated with the pasageway means to selectively open and close communication with the atmosphere, said atmosphere chamber being in communication at each end to a bore, a shaft in one bore extending from the actuator piston, a bleed port in the end of the shaft isolated from the actuator pressure chamber by the engagement of the shaft with the bore, but communicating with passageway means through the shaft that communicates with the actuator pressure chamber, a pilot piston in a cylinder formed in the support means at the end adjacent the outlet and a stem on said pilot piston received in one bore of the atmosphere chamber and having means for coacting with said bleed port to restrict the opening of same upon movement of the pilot piston toward the actuator piston upon detection of a pressure at the outlet above a set pressure.

10. A pressure regulator as defined in claim 9, wherein the bleed port is substantially larger than said bleed hole.

References Cited
UNITED STATES PATENTS 3,275,022 9/1966 Kobayashi et al. _____ 137—221
3,447,775 6/1969 Katchka et al. ____ 137—489 X M. CARY NELSON, Primary Examiner M. O. STURM, Assistant Examiner U.S. Cl. X.R.
137—221, 491, 495